US010244898B2

(12) United States Patent
Ganninger

(10) Patent No.: US 10,244,898 B2
(45) Date of Patent: Apr. 2, 2019

(54) SYSTEM AND METHOD FOR AUTOMATED PREPARATION OF FOOD-BASED MATERIALS

(71) Applicant: Mark Ganninger, Leander, TX (US)

(72) Inventor: Mark Ganninger, Leander, TX (US)

(*) Notice: Subject to any disclaimer, the term of this patent is extended or adjusted under 35 U.S.C. 154(b) by 0 days.

(21) Appl. No.: 15/699,862

(22) Filed: Sep. 8, 2017

(65) Prior Publication Data

US 2018/0070776 A1 Mar. 15, 2018

Related U.S. Application Data

(60) Provisional application No. 62/385,486, filed on Sep. 9, 2016.

(51) Int. Cl.

| A47J 37/12 | (2006.01) |
|---|---|
| A47J 44/02 | (2006.01) |
| A21C 9/04 | (2006.01) |
| A21C 9/08 | (2006.01) |
| A47J 27/62 | (2006.01) |
| A47J 43/04 | (2006.01) |
| H05B 11/00 | (2006.01) |

(52) U.S. Cl.
CPC ............. *A47J 44/02* (2013.01); *A21C 9/04* (2013.01); *A21C 9/08* (2013.01); *A47J 27/62* (2013.01); *A47J 43/04* (2013.01); *H05B 11/00* (2013.01)

(58) Field of Classification Search
CPC .... A21C 9/04; A21C 9/08; A47J 27/62; A47J 43/04; A47J 44/00; A47J 44/02; B25J 11/0045; B25J 11/008; H05B 11/00

USPC ............................................. 99/325
See application file for complete search history.

(56) References Cited

U.S. PATENT DOCUMENTS

| 3,780,643 A | 12/1973 | Papai | |
|---|---|---|---|
| 2002/0176921 A1* | 11/2002 | Torghele | A21C 1/06 426/549 |
| 2003/0234264 A1* | 12/2003 | Landau | A47G 19/34 222/368 |
| 2005/0193901 A1 | 9/2005 | Buehler | |
| 2013/0089642 A1* | 4/2013 | Lipson | A23P 20/20 426/115 |
| 2015/0230664 A1* | 8/2015 | Freas, II | A47J 44/00 366/138 |
| 2016/0073644 A1* | 3/2016 | Dickey | A23P 20/20 700/233 |

OTHER PUBLICATIONS

Barcessat, Lise; International Search Report and Written Opinion; PCT/US2017/050804; dated Nov. 10, 2017; 11 pages.

* cited by examiner

*Primary Examiner* — Dana Ross
*Assistant Examiner* — Brandon T Harvey
(74) *Attorney, Agent, or Firm* — Dickinson Wright PLLC; Kristopher Lance Anderson

(57) ABSTRACT

Disclosed is an invention in the field of automated food preparation. The present invention particularly relates to a system and method to prepare food items by automatically placing food items on a food preparation surface utilizing a multi-axis robot. Upon loading predetermined coordinates into a computing device, a computer program calculates the instructs the robot via a controller to load the required food items via one or more food ingredient dispensing heads automatically.

16 Claims, 23 Drawing Sheets

SYSTEM AND METHOD FOR AUTOMATED PREPARATION OF FOOD-BASED MATERIALS

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

STATEMENT OF FEDERALLY FUNDED RESEARCH

None.

CROSS-REFERENCE TO RELATED APPLICATIONS

The present application is related to U.S. Provisional Patent Application 62/385,486, filed on Sep. 9, 2016, titled "System and Method for Automated Dispensing of Food-Based Materials," the content of which is incorporated by reference in its entirety.

TECHNICAL FIELD

The present invention relates in general to the field of automated assembly. In particular, the present invention relates to automated dispensing of food or food-based materials.

BACKGROUND OF THE DISCLOSURE

There are currently several methods for automated manufacture of high volume food products. The advantages of these systems over conventional, manual food preparation and creation are speed of manufacturing, portion control, and low cost of final product. These methods produce products of the same configuration with minimal opportunity for customization. These methods are also designed for large scale production and not really suited for local restaurants and individual proprietors due to their price, size, and lack of need for high volume.

As an example, local pizza chains and proprietors produce pizza by hand in a build-to-order process. This process allows the customer to custom design their pizza, to some degree by, selecting specific toppings, crust, etc. The process of customization requires operators to build the custom pizza by hand which creates variability in the quantity of material as well as the quality and even distribution of material. All factors which affect price and the customer experience. There is also the hygiene aspect of creating a hand built pizza which is reliant on the diligence of the operator's cleanliness. Further, while there are semi-automated pizza and food component delivery systems, there remains a need for automated pizza and other food creation systems in the area of customized, hygienic, volume consistent production. Another factor in dispensing some food ingredients is that the materials are difficult feed in a controlled manner due to how they are presented. As another example, cheeses, especially mozzarella, tend to clump and stick together making it difficult to get even distribution. On sausage products, they are difficult to dispense in the pre-sliced configuration as they tend to stick together and are difficult to dispense one at a time. Further, while these technological advances have allowed for automated application of food ingredients, there remains a need in the art custom designed and automated assembly of food items.

SUMMARY OF THE DISCLOSURE

The present disclosure addresses failings in the art by providing a system to programmatically dispense items such as pepperoni, cheese, sauce, sausage, hamburger, etc. on a pizza or other food products. It is one object of the disclosure to automatically dispense ingredients on a pizza or other food product using multiple, interchangeable ingredient heads, some driven by a motor and utilizing a multi-axis robot. It is a second object of this present disclosure to utilize a dispensing head that consists of a drive system, tool changing device, and multiple end effector heads for dispensing ingredients. It is another object of the present disclosure for a user to create digital representations of ingredients, in specific patterns or designs, onto a digital representation of the pizza crust or other food product. This digital design could be created on a computer or mobile device. Once the digital design is created the information is sent to the system for creation of the pizza or other product.

Current creation of pizza and other multiple component food products is a time consuming process that is done by hand with minimal quantity control and cleanliness. Known methods to create custom designs of pizza are limited to specific quantities and not design unless created by a user. It is one object of this disclosure to have the creation of the majority of the pizza or other food product at one station with one robot. The robot would pick the ingredient dispenser from its location, dispense the ingredient in the programmed pattern and quantity and then return the ingredient dispenser to its storage location. This process would repeat until all ingredients of the design have been dispensed. Additional toppings that are not included in the automation can be added by hand.

It is another object of this disclosure that the dispensing heads for dispensing some of the ingredients address the issue with automating delivery and control of some of the food products. By grating the cheese as it is applied to the product, the clumping and consistency after it is applied is addressed. By slicing the pepperoni as it is dispensed, the placement location is controlled.

It is another object of this disclosure that, as the business volume increases, additional systems can be placed in series or parallel to increase production. The cell could be configured to apply a reduced subset of ingredients where, for example, one system dispenses the sauce and cheese and a second system dispenses the pepperoni and other ingredients.

The present disclosure may further provide methods reducing the amount of required tending of the system by adding additional feeding modules to the system. This would include cheese block feeders that pre-chill the cheese for grating, pepperoni dispensers that automatically load pepperoni into the feeding head when it is empty, ground sausage and hamburger dispensers that load additional ingredients into the ingredient dispenser, etc. All of these items have the benefit of reducing the interaction of an individual with the system.

The present disclosure further provides a controller device comprising software which allows for a user to create designs to be implemented onto an object. The controller comprises may include storage for designs and artwork available to create designs based on the ingredients available. The controller allows for various functions including design, review, and modification of the applicable design for applying ingredients to an object. The controller may be connected to a computer where software communicates with the controller to activate and control the application of ingredients to a product.

It is therefore an object of the present invention to provide an apparatus for preparation of food items, comprising: a robot assembly having a dispensing master; one or more of a removably attachable food ingredient dispensing head within reach of the dispensing master of the robot assembly, wherein the one or more removably attachable food ingredient dispensing head is selected from a group consisting of: sauce dispensing heads, cheese dispensing heads, sliced food dispensing heads, and ground food dispensing heads, wherein the dispensing master is operably connectible to the each of one or more removably attachable food ingredient dispensing heads; a food ingredient dispensing head support surface for storing the one or more food ingredient dispensing heads within reach of the robot assembly; a food preparation surface within reach of the robot assembly for preparing food items; and a controller in electronic communication with the robot assembly via a communication link further comprising a computing device, memory storing computer-executable instructions, and one or more processors.

In one aspect the robot assembly comprises a multi-axis robot configurable to perform predetermined movements. In another aspect the dispensing master further comprises a master tool motor. In another aspect the dispensing master further comprises a gripping device for removably attaching a food ingredient dispensing head. In another aspect the one or more food ingredient dispensing heads comprise at least one sauce dispensing head. In another aspect the one or more food ingredient dispensing heads comprise at least one cheese dispensing head. In another aspect the one or more food ingredient dispensing heads comprise at least one sliced food dispensing head.

In one aspect the one or more food ingredient dispensing heads comprise at least one ground food dispensing head. The sauce dispensing head may further comprise a reservoir and a pump capable of pumping sauce from the reservoir onto the food item.

The cheese dispensing head may further comprise a grating disk driven by a dispensing master tool motor and a cylinder for applying pressure to a cheese block. The cheese dispensing head may further comprise a thermo-coupler operably connected to a chilled coupler while in storage to maintain temperature of the cheese.

In another aspect, the ground food dispensing head further comprises a paddle wheel or auger driven by a dispensing master tool motor moves ingredients out of a reservoir onto the food items.

In yet another aspect, the sliced food dispensing head further comprises a blade for slicing meat extruded through a storage tube located on the sliced food dispensing head, said blade driven by a dispensing master tool motor, and wherein the sliced food is sliced to drop onto a food item at a programmed position.

In another aspect the food preparation surface transfer device is capable of transferring food into and from the food preparation surface. The surface transfer device may comprise a conveyor belt, or the surface transfer device may comprise a tray system removable by the robot assembly.

It is another object of the present invention to provide a method for placement of food items on a three-dimensional object, comprising: (a) positioning a food preparation surface within reach of a robot assembly having a dispensing master; (b) removably and operably attaching one or more food ingredient dispensing heads to the dispensing master located on the robot assembly, wherein the one or more removably attachable food ingredient dispensing heads are selected from a group consisting of: sauce dispensing heads, cheese dispensing heads, sliced food dispensing heads, and ground food dispensing heads; (c) dispensing at least one food ingredient from the at least one of the one or more food ingredient dispensing heads at a preconfigured location via the robot assembly having attached the at least one food ingredient dispensing head; and repeating steps (a) through (c) for the number of food ingredients desired for the number of food items on the food preparation surface.

In one aspect, the sauce is dispensed from the sauce dispensing head onto a food item from a reservoir pressurized by a pump capable of pressurizing sauce from the reservoir, through the sauce dispensing head onto the food item.

In another aspect, cheese dispensed from the dispensing head onto food items by a grating disk driven by a dispensing master tool motor and a cylinder for applying pressure to a cheese block.

In another aspect, ground foods are dispensed from the ground food dispensing head by operating an auger driven by the dispensing master tool motor to move ground food out of a hopper onto food items.

In another aspect, sliced foods are dispensed from the sliced food dispensing head by operating a blade for slicing food extruded through a storage tube located on the sliced food dispensing head, said blade driven by a dispensing master tool motor, and wherein the sliced food is sliced to drop onto a food item at a programmed position.

In another aspect of the present invention, the food items are automatically transferred to and from the food preparation surface. This may occur by the food preparation surface comprising a conveyor belt on the food preparation surface. Alternatively, the surface transfer device comprises a tray system removable by the robot assembly.

The details of one or more embodiments of the present disclosure are set forth in the accompanying drawings and description below. Other aspects, features and advantages will be apparent from the description and drawings.

BRIEF DESCRIPTION OF THE DRAWINGS

The foregoing and other objects, features, and advantages of the disclosure will be apparent from the following description of embodiments as illustrated in the accompanying figures and drawings.

DETAILED DESCRIPTION OF THE DISCLOSURE

Figure 1A:
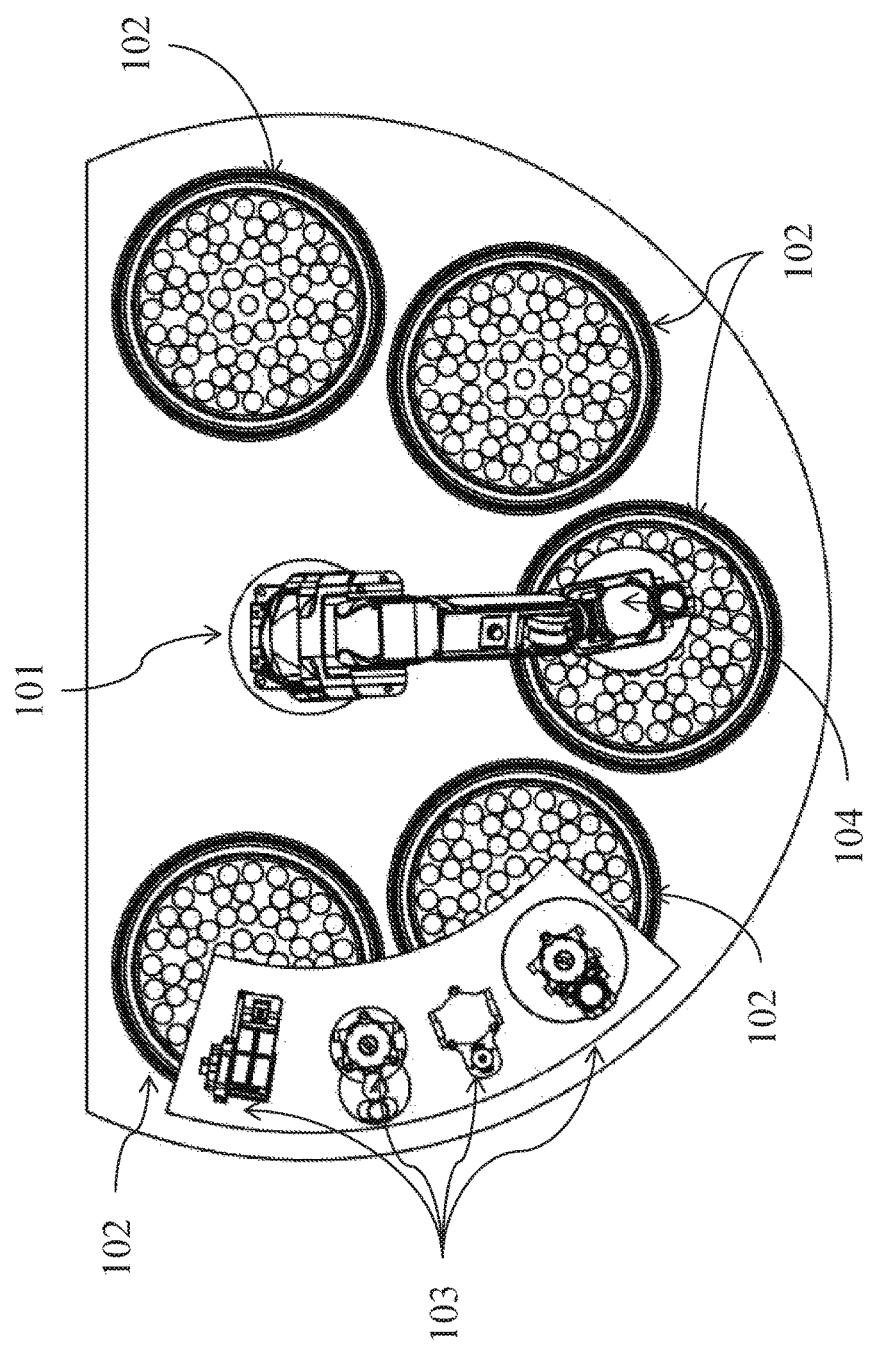
FIG. 1A depicts an overhead orthographic view of the system preparing multiple food products.

While the making and using of various embodiments of the present invention are discussed in detail below, it should be appreciated that the present invention provides many applicable inventive concepts that can be embodied in a wide variety of specific contexts, goods, or services. The specific embodiments discussed herein are merely illustrative of specific ways to make and use the disclosure and do not delimit the scope of the disclosure.

All publications and patent applications mentioned in the specification are indicative of the level of skill of those skilled in the art to which this disclosure pertains. All publications and patent applications are herein incorporated by reference to the same extent as if each individual publication or patent application was specifically and individually indicated to be incorporated by reference.

The present invention will now be described more fully hereinafter with reference to the accompanying figures and drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, compositions, processes, or systems. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

For the purposes of the present invention, a robot arm assembly is a mechanical robot usable for an industrial robot adapted to freely bend to realize a pattern of movement having a high ability of movement, excellent reachability and high accuracy by virtue of a comparatively small amount of rotational movement and a comparatively large amount of translational movement. The robot arm has cylindrical arm flexibly connected to one after another via joints, and the arm portions comprise one upper arm, at least one intermediate arm and one lower arm. Coupled to the lower arm is a hand, or end-of-arm tool which is capable of performing certain predetermined tasks. As an exemplary embodiment, the robot arm may be an A 6-axis robot, such as a FANUC LR MATE 200ID, is configured to convert given position data, which is expressed by fixed three-dimensional orthogonal coordinates, to angle data for a rotation joint of the robot and move an end effector (i.e., hand) of the robot to a position indicated by the position data.

Robot arms used in such systems are jointed so that the tool can be moved to any position within a three-dimensional envelope, commonly referred to as the working envelope of the arm. The actual movement of the joints of the arm is accomplished by motors or other actuators. The operation of the motors is usually accomplished under computer control. In this regard, in state-of-the-art robotic systems, the arms are controlled by computer means which include one or more processors for effecting movement of the arm to various positions within the working volume in accordance with predetermined teachable and repeatable programs. To accomplish such control, the joint motors frequently have associated with them encoders to provide signals indicative of joint position. These signals are operated on by mathematical computation means in the system's computing device so that the exact position of the robot assembly within the working volume is determined to insure accurate arm positioning when the joint motors are operated to move the arm to another position within the working volume.

In one embodiment information is passed to a controller and robot arm assembly via a communication link. The robot will dynamically adjust the W orientation for optimum orientation of the robot for the particular place. In one embodiment, the robot coordinate system (an X, Y, Z, U, V, W user coordinate system) is set up such that the coordinate system for the product in the computer program instructions matches the user coordinate system. The computing device reads in the X, Y, Z, U, & V data for the food items selected.

For the purposes of the present disclosure "food ingredients" includes, but is not limited to: sauces, meat items in either stick, chopped, diced, ground, and the like, cheese of all types including block cheese, grated cheese, powdered cheese or liquid cheese, ground foods including meats, fruits, vegetables, and spices, as well as other ingredients such as vegetables, pickles, peppers, tomatoes, herbs, spices, and the like, in all of the aforementioned forms, sizes, shapes, and types. "Food items" or "food products" are prepared foods such as sandwiches, hamburgers, pizzas, calzones, gyros, salads, food platters, hand held foods, pies, desserts, and other foods for consumption by animals.

Turning to the present disclosure, a preferred embodiment comprises an apparatus having a device retrieving various food ingredient dispensing heads and placing them on an object. The device comprises a robot assembly having a master tool with a tool motor and a gripping device, referred to as the 'dispensing master'. The gripping device can attach to multiple food ingredient dispensing heads, such as a sauce dispensing head, a cheese dispensing head, a sliced food dispensing head, and a ground food dispensing head. The attachment of the gripping device to ingredient dispensers also couples the tool motor drive output to the ingredient drive input.

In another exemplary embodiment, a food ingredient dispensing head is provided for slicing and dispensing cased food products such as pepperoni, sliced meats, ground meats, cheeses, sauces, and the like, where the dispensing master tool motor drives a blade that slices the pepperoni which then drops onto the pizza at a programmed position. Multiple diameters of pepperoni can be sliced by changing the magazine cylinder and different thicknesses can be sliced by changing the blade holder on the dispenser.

In another embodiment, a cheese dispensing head is provided for grating block cheeses such as mozzarella, where the dispensing master tool motor drives one of a grating drum, grating plate, or grating disk, while a cylinder applies pressure to a block of cheese. The force of the cylinder, the speed of the drive tool motor, and the speed of the robot movement will allow the precise application coverage of cheese on the pizza. The cheese reservoir would have a thermal coupler that, when the ingredient head is not on the robot but in the ingredient storage enclosure, the thermal coupler will contact a chilled coupler in the enclosure. This attachment will keep the cheese block cold, allowing for more consistent grating of the cheese.

In another exemplary embodiment, a sauce dispensing head for dispensing sauce such as tomato based pizza sauce, where sauce is pumped from a reservoir, through a hose, to the ingredient dispensing head. The ingredient dispensing head creates a fan pattern of sauce when dispensed on the pizza. The dispensing head orientation is controlled by the drive tool motor providing maximum coverage on the pizza in the minimum amount of time. The coverage amount is controlled by the speed of the pump and the speed of the robot. In another embodiment, the ingredient would be a round head that would allow the head to create a line pattern which, when driven by the robot, would allow creation of unique designs.

In another embodiment, a ground food dispensing head for dispensing ground or chopped food products such as ground beef, ground sausage, chopped onions, chopped jalapenos, etc., where a paddle wheel or auger driven by the master tool drive moves ingredients out of a reservoir onto the food items, such as a pizza crust. The dispensing quantity would be controlled by the speed of the tool motor and the speed of the robot.

In another embodiment, an ingredient storage enclosure, where ingredient heads are stored in a climate controlled area. The storage enclosure would consist of tool racks that precisely locate the ingredient heads for pick-up by the robot. The enclosure would have an inner and outer door allowing access to the tooling by the robot from the inner door and allowing access to the tooling by the user from the outer door. The doors will be designed such that the outer doors cannot be opened unless the inner door is closed or the robot is in a safe state.

In another embodiment, a tray transfer device to move the food items, such as unprepared dough or bread, into the system and out of the apparatus food preparation surface. The transfer device moves a tray holding the food item into position on the food preparation surface for application of ingredients. The transfer device may comprise two conveyors or a walking beam type push transfer. The robot may further be capable of handling a tray of food items and transferring it into and out of food preparation apparatus.

In another embodiment, a computer assists in creating and implementing the ingredient design to be placed upon the object of interest. The software or computer-based features of present disclosure is described herein with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor. For the purposes of this disclosure a network should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example. For purposes of this disclosure, a wireless network should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like. A computing device may further include a mobile device, such as a smartphone, tablet, or other handheld devices comprising wireless capability.

The system configuration of the robot comprising the master tool and ingredient heads is driven by a computing device which transmits the ingredient head to be used, the size of the object to be assembled, the location of the ingredients on the object, and the quantity or density of the ingredients on the object. The robot controller has a control unit and network interface unit. The computing device has a computer readable medium capable of dragging stored ingredients corresponding to the applicable ingredient heads available to the robot. Designs may be incorporated via known available means, and the image is converted to a workable graphical representation of the object to be decorated. The design capability allows for the desired pattern of ingredients to be attached to the object. Upon completion of the design of the decorative element placement, the control unit receives, via a bus, the design to be implemented. The design capability also allows for the setting of quantities of materials in the design such as more or less sauce, more or less cheese, etc.

Certain embodiments will now be described in greater detail with reference to the figures. Referencing FIGS. 1A-F, the system of the present disclosure comprises a robot capable of movement around an object. The robot chassis carries a movable dispensing master head with replaceable ingredient heads to place ingredients on an object. The dispensing master is a member which is attached to the arm of the robot and is capable of attaching to multiple ingredient heads. The ingredient heads are members which, when attached to the dispensing master, are capable of placing ingredients on the object.

Turning to FIG. 1A, the robot arm, or robot 101, is centrally located within an enclosed facility comprising one or more food items 102, the dispensing master 104 is equipped from time to time with one or more food ingredient dispensing heads 103, capable of dispensing various ingredients. The robot 101 is further capable of placing the dispensing master 104 in a position to disconnect and connect to various dispensing heads located distally from the central axis of the robot 101.

Figure 1B:
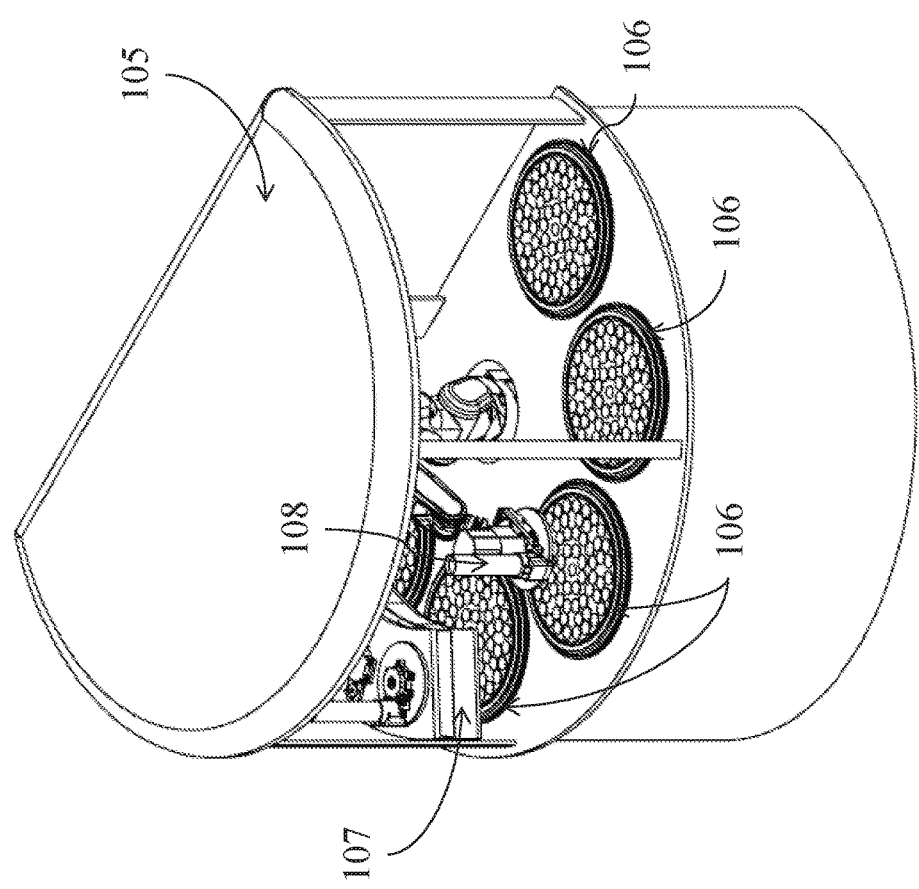
FIG. 1B depicts an overhead perspective view of the system preparing multiple food products.
Figure 1C:
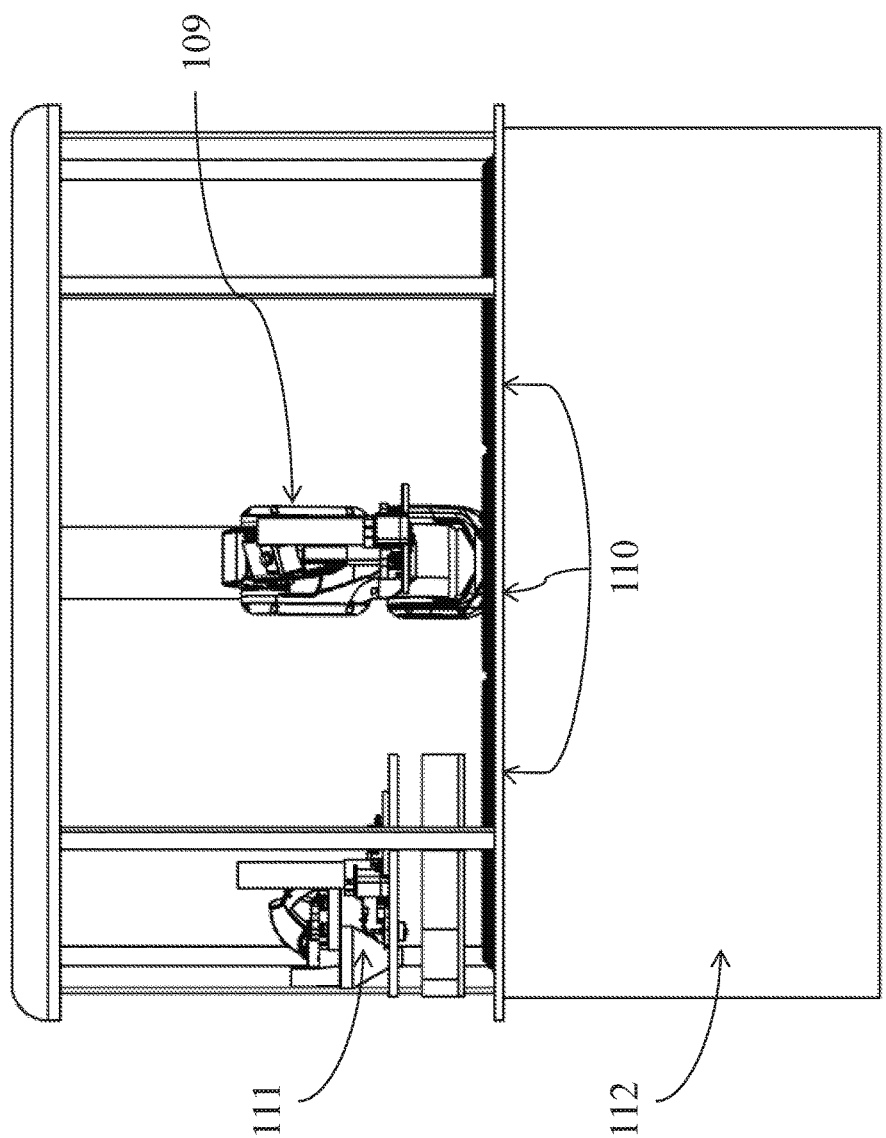
FIG. 1C depicts a front orthographic view of the system preparing multiple food products.

FIG. 1B provides a top perspective view of an automated food preparation system 105 of the present invention, comprising a robot having a dispensing master 108 capable of retrieving one or more dispensing heads from an available surface 107, for purposes of dispensing one or more food ingredients onto a food item 106. FIG. 1C provides a front orthogonal view of the system of the present invention, wherein a base 112 provides a surface comprising food items 110 which may be further processed via a robot 109 centrally located within the system. The robot 109 is capable of retrieving one or more food ingredient dispensing heads 111 from an available food ingredient dispensing head support surface.

Figure 1D:
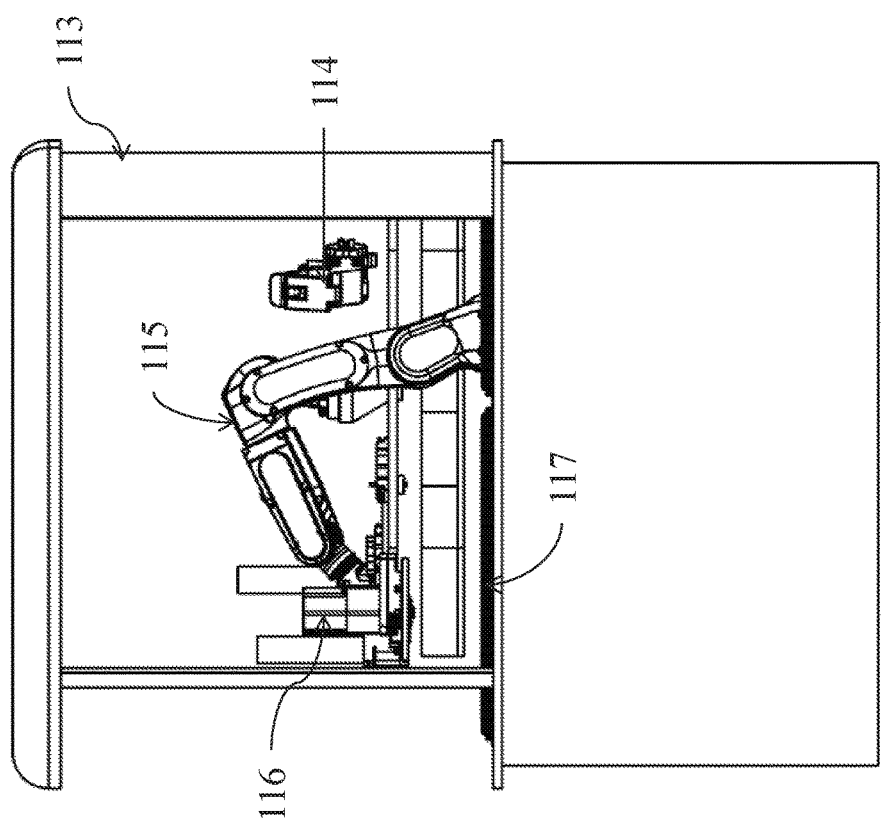
FIG. 1D depicts a first side orthographic view of the system preparing multiple food products.
Figure 1E:
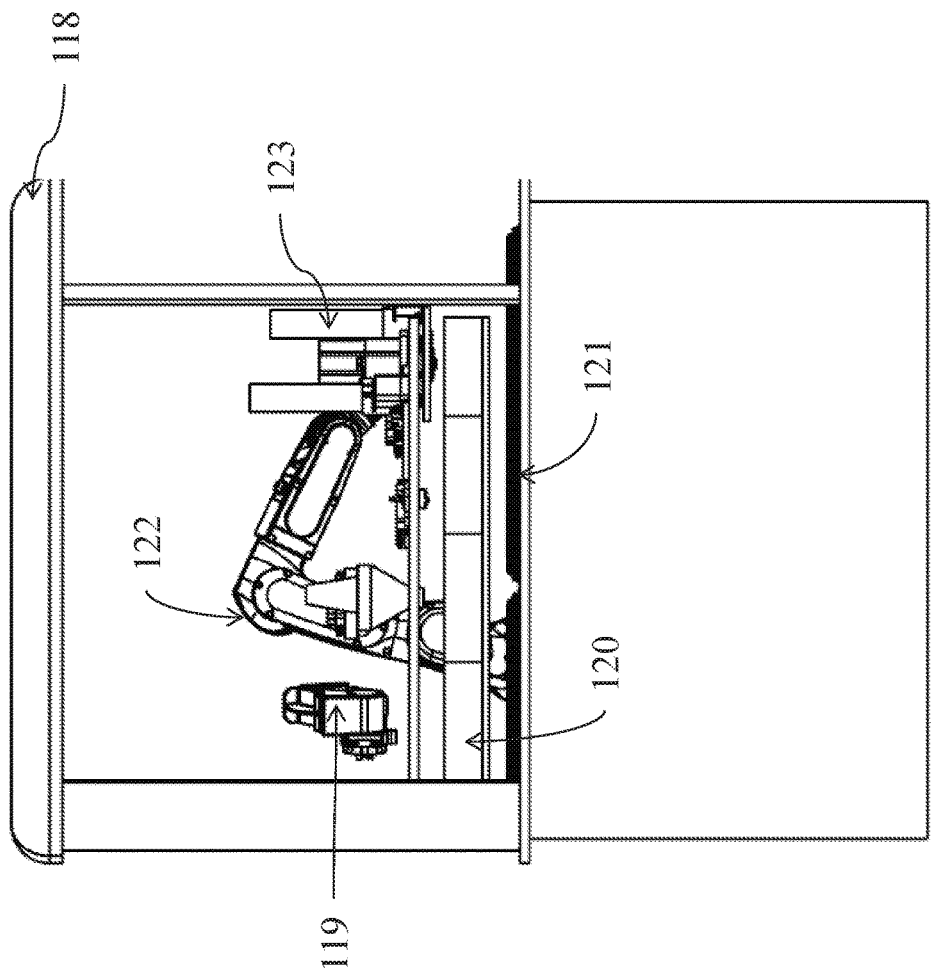
FIG. 1E depicts a second side orthographic view of the system preparing multiple food products.

FIG. 1D provides a first side orthogonal view of the system 113 comprising a robot 115, dispensing master 116 and one or more food ingredient dispensing heads 114 for dispensing the one or more food ingredients. The food preparation surface 117 comprises food items being prepared via the robot 115 and various food ingredient dispensing heads 114. FIG. 1E provides a second orthogonal view of the system 118 comprising a robot 122, dispensing master with dispensing head attached 123, and a storage surface 120 for the various food ingredient dispensing heads 119. The storage surface 120 is located above a food preparation surface 121, allowing for the robot 122 to access the various food ingredient dispensing heads 119. In one embodiment, at least one food ingredient dispensing head is utilized. In another embodiment, at least two food ingredient dispensing heads are utilized. In yet another embodiment, at least three food ingredient dispensing heads are utilized. In another embodiment, more than three ingredient dispensing heads are utilized by the system of the present invention.

Figure 1F:
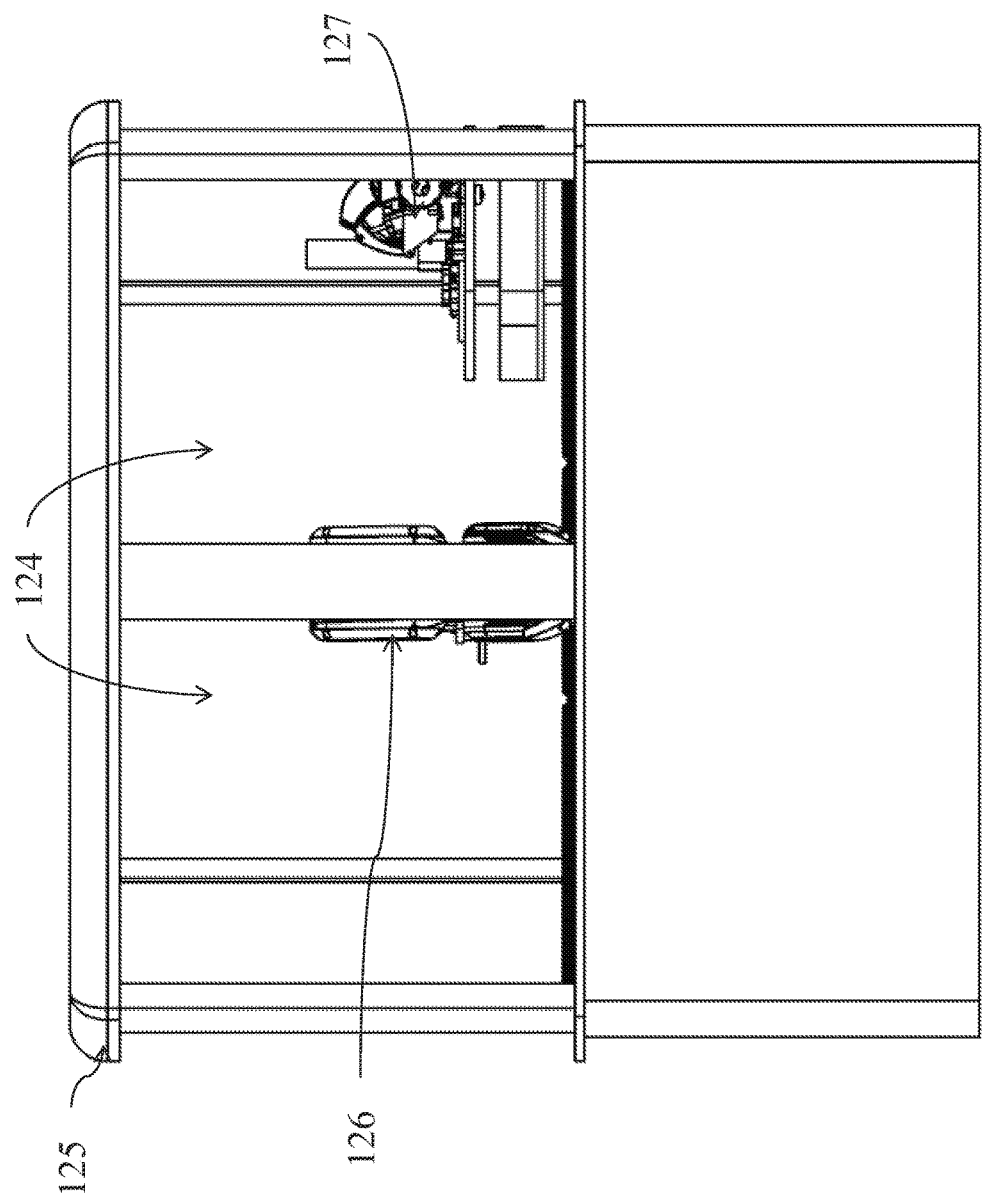
FIG. 1F depicts a rear orthographic view of the system preparing multiple food products.

FIG. 1F provides a rear orthogonal view of the system of the present invention. The food preparation system 125 comprises one or more rear windows 124 capable of opening for purposes of providing operator access or access to other food ingredients, containers, or dispensing heads. Food dispensing heads 127 are available to the robot 126 for food preparation activities.

Figure 2:
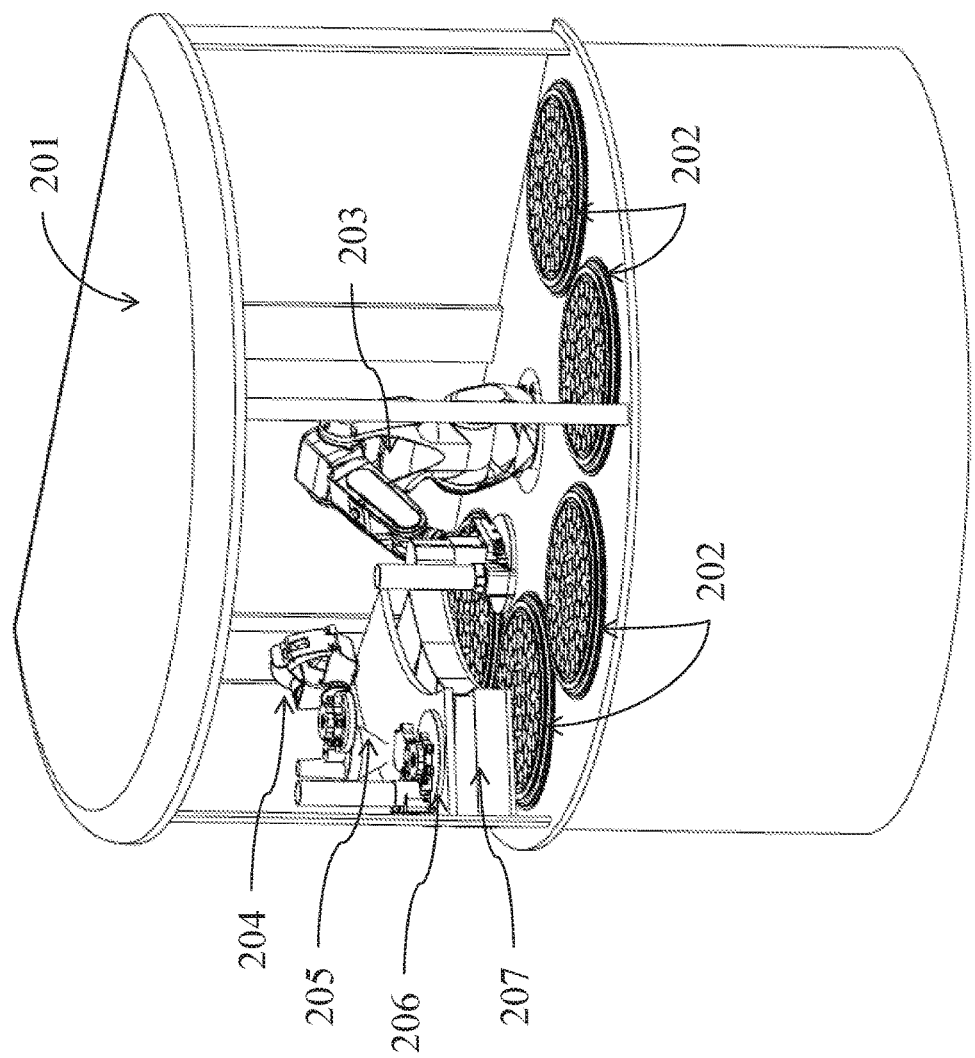
FIG. 2 depicts an isometric view of the system of the present disclosure, including the robot arm, robot master tool, four ingredient tools, ingredient storage and the product transfer.

FIG. 2 provides an isometric view of the entire system, including the food preparation system 201. Referencing FIG. 2 the robot 203 is capable of retrieving the desired ingredient from the ingredient enclosure via available food ingredient dispensing heads 204, 205, 206. The robot 203 then operates to dispense food ingredients to the food items 202. Once fully prepared the food items are removed, either manually or automatically via the robot. The food preparation system 201 outer door opens allowing retrieval of the prepared food items. In one embodiment, the food preparation system is capable of creation of a pizza using a sliced food dispensing head, 206, a cheese grater dispensing head 204, and a ground ingredient dispensing head 205, and further a sauce dispensing head, which may be presented on a storage surface 207. The robot 203 moves to the position of the desired dispensing head and aligns the dispensing master locating pins on the sauce dispensing head alignment holes. The robot 203 then clamps or grasps the sauce dispensing head with the clamp features, locking the dispensing master to the sauce dispensing head. This operation also aligns the dispensing master drive output to the dispensing head drive input. The robot 203 then removes the applicable food ingredient dispensing head from the ingredient dispensing head storage surface 207. Once the robot is clear from the ingredient dispensing head 204, 205, 206 storage surface 207 the robot then addresses the object of interest by interpreting the computer program instructions. The robot 203 then moves the food ingredient dispensing head over the food items 202 in the programmed pattern, controlling the robot speed, dispensing or pump speed, head orientation, or pump on and off control. Once dispensing of the desired ingredient is complete, the robot 203 returns the dispensing head to the ingredient dispensing head 204, 206, 206 storage surface 207.

The computer program then interprets the next ingredient to be applied. For example, cheese is programmed as the next ingredient. The robot arm then retrieves the cheese dispensing head 204 in the same process as was followed with the previous food ingredient dispensing head. The arm then addresses the food item 202 of interest by interpreting the computer program instructions. The robot then moves the cheese dispensing head 203 over the object in the programmed pattern, controlling the robot speed, grater speed, and cheese pressure. Once dispensing of the cheese is complete, the robot returns the cheese dispensing head 203 to the ingredient enclosure.

The computer program then interprets the next ingredient to be applied. In one example, ground meat is the next ingredient. The robot arm then retrieves the ground meat dispensing head 205 and repeats the same process as with the cheese dispensing head 202. The arm then addresses the food item 202 of interest by interpreting the computer program instructions. The robot then moves the ground meat dispensing head 205 over the object to the programmed positions, controlling the ground meat dispensing head blade. Once dispensing of the ground meat is complete, the robot returns the ground meat dispensing head 205 to the food ingredient dispensing head support surface 207.

The process is repeated for any other ingredients that have a dispensing head on the food ingredient dispensing head support surface. Once the assembly of the food item is complete the food item 202 is conveyed out of the system to an operator, which may be via the robot 203. A digital display of the designed object is displayed to the operator allowing the operator to check the final object and add any ingredients that were not included in the ingredient dispensers or to repair any errors created by the automated system.

Figure 3:
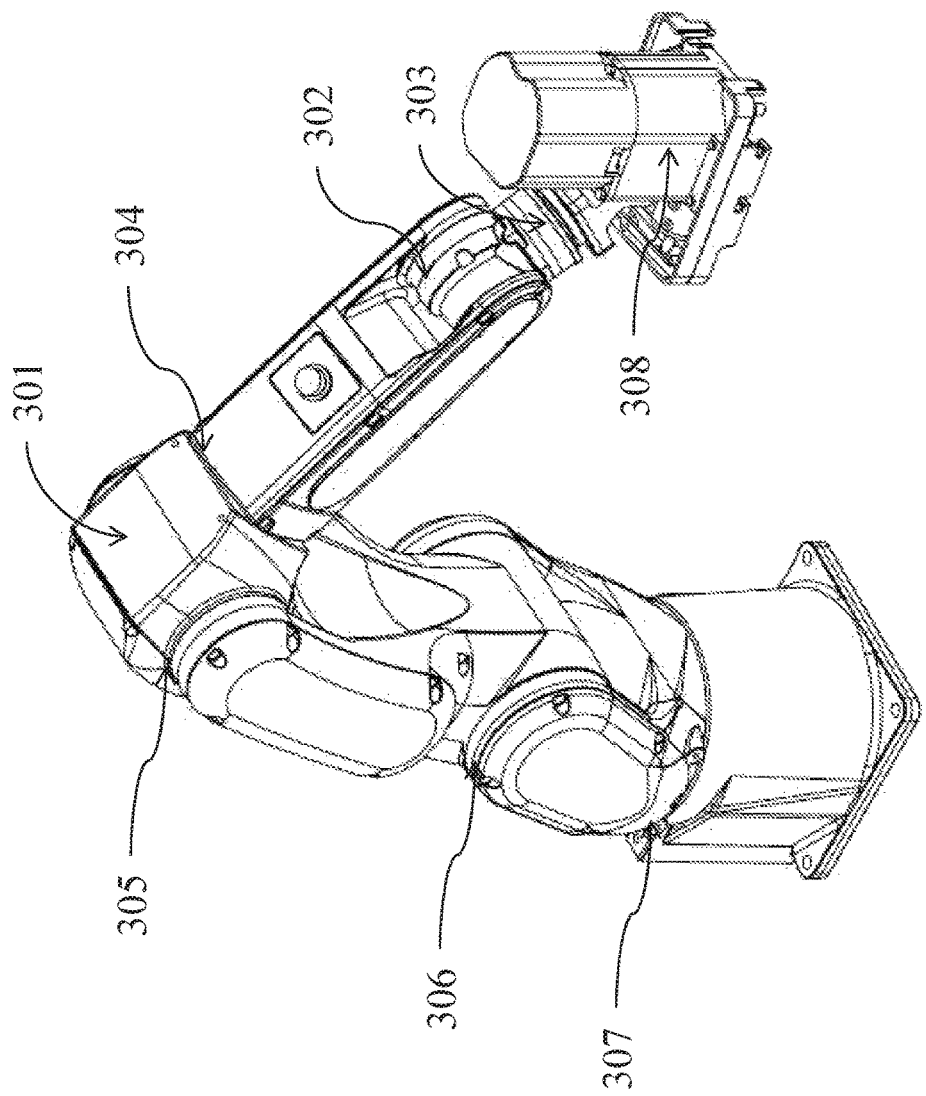
FIG. 3 depicts an isometric view of the robot with the robot master tool.
Figure 4:
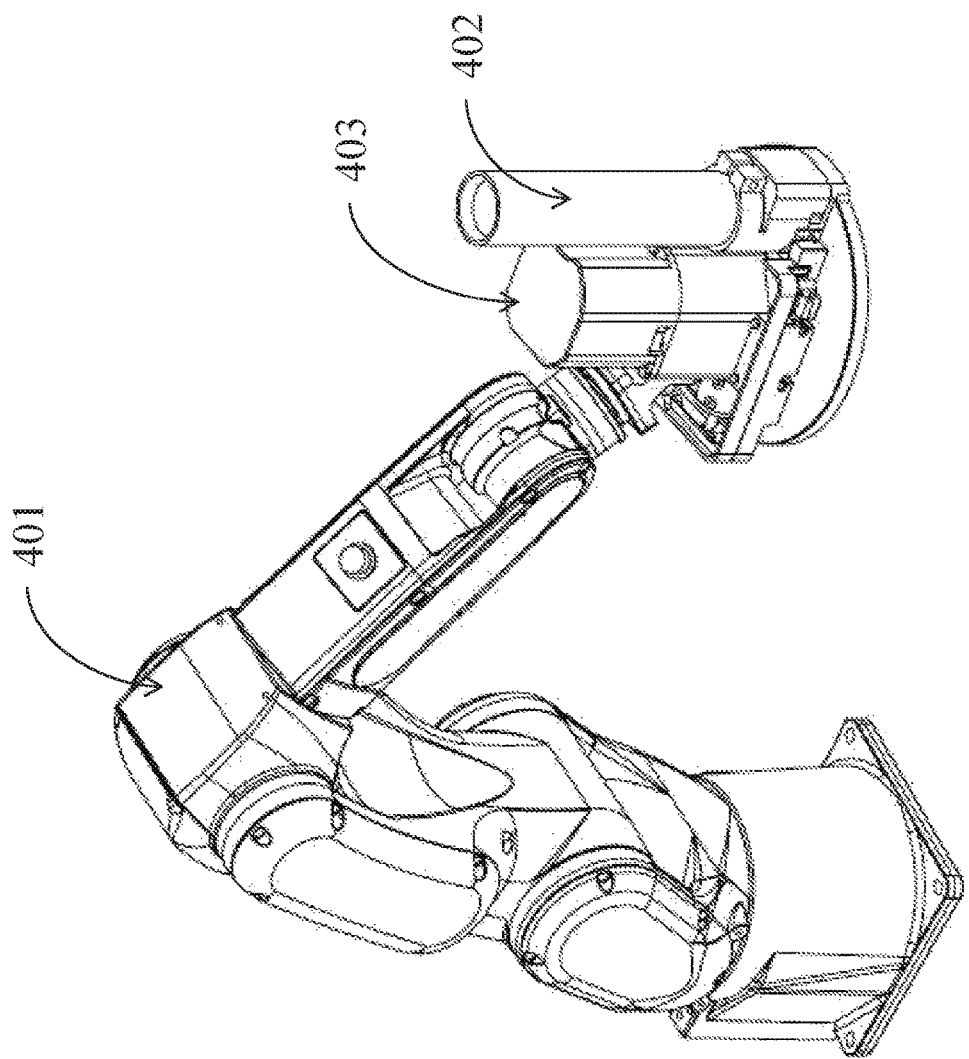
FIG. 4 depicts an isometric view of the robot with master tool and sliced food slicer.

Referencing FIG. 3 an exemplary robot 301, having six axis points 302, 303, 304, 305, 306, 307, is shown with the dispensing master 308 without an ingredient dispensing head attached. Referencing FIG. 4 the robot 401 is shown with the pepperoni dispenser 402 attached to the dispensing master robot tool 403.

Figure 5A:
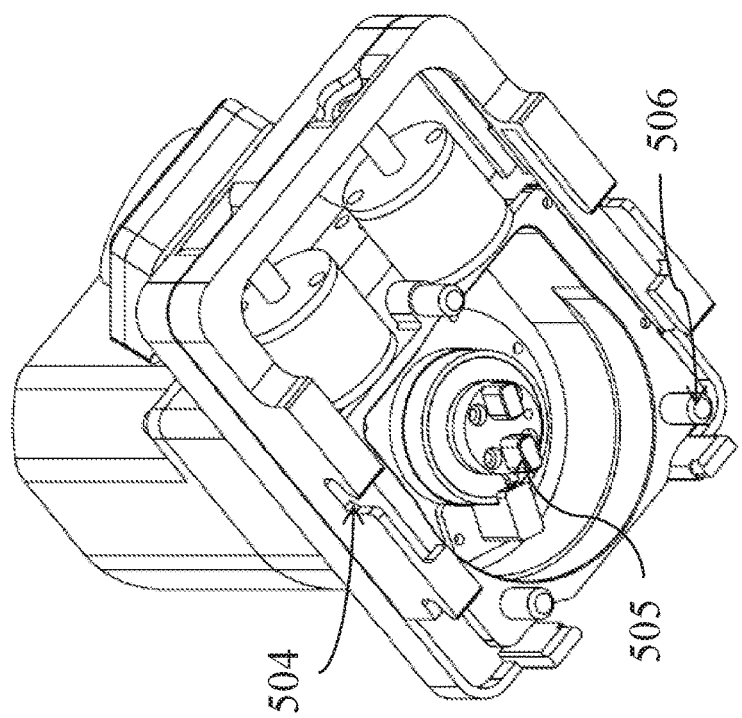
FIG. 5A depicts a top perspective view of the robot master tool.
Figure 5B:
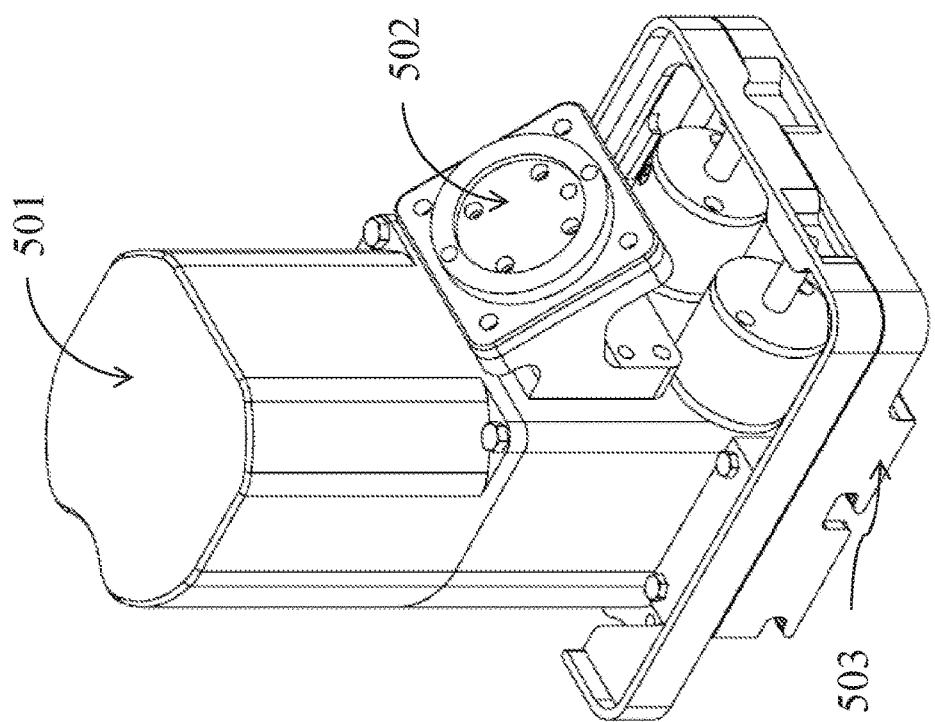
FIG. 5B depicts a bottom perspective view of the robot master tool.
Figure 6:
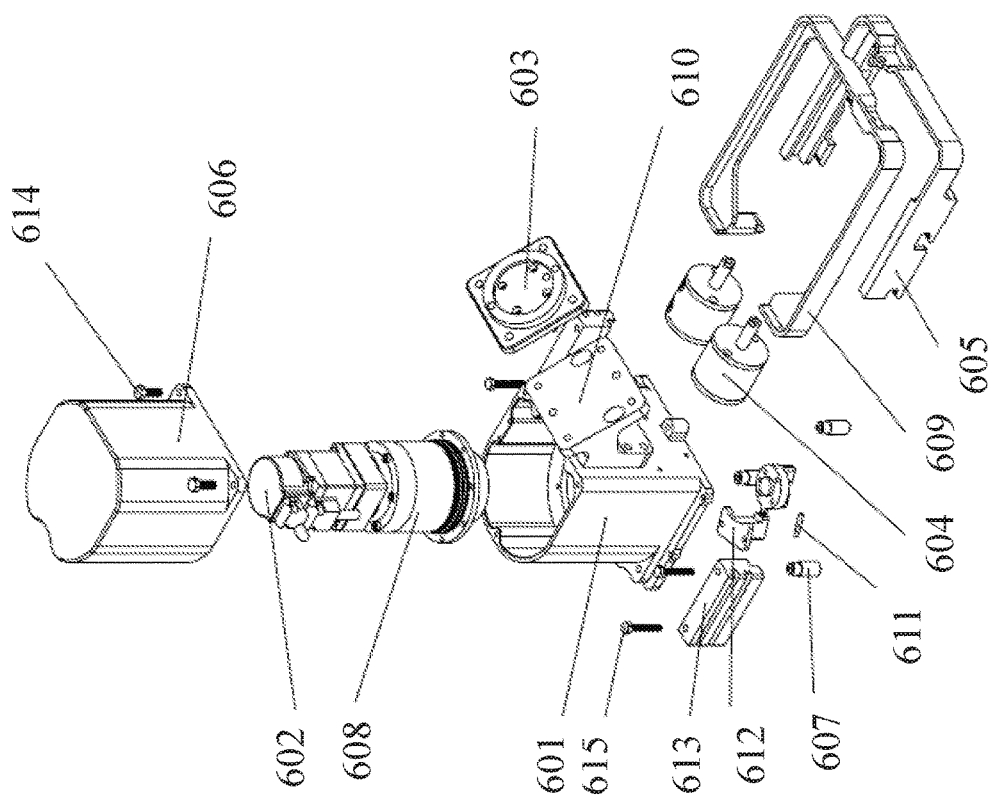
FIG. 6 depicts an exploded view of the robot master tool.
Figure 7:
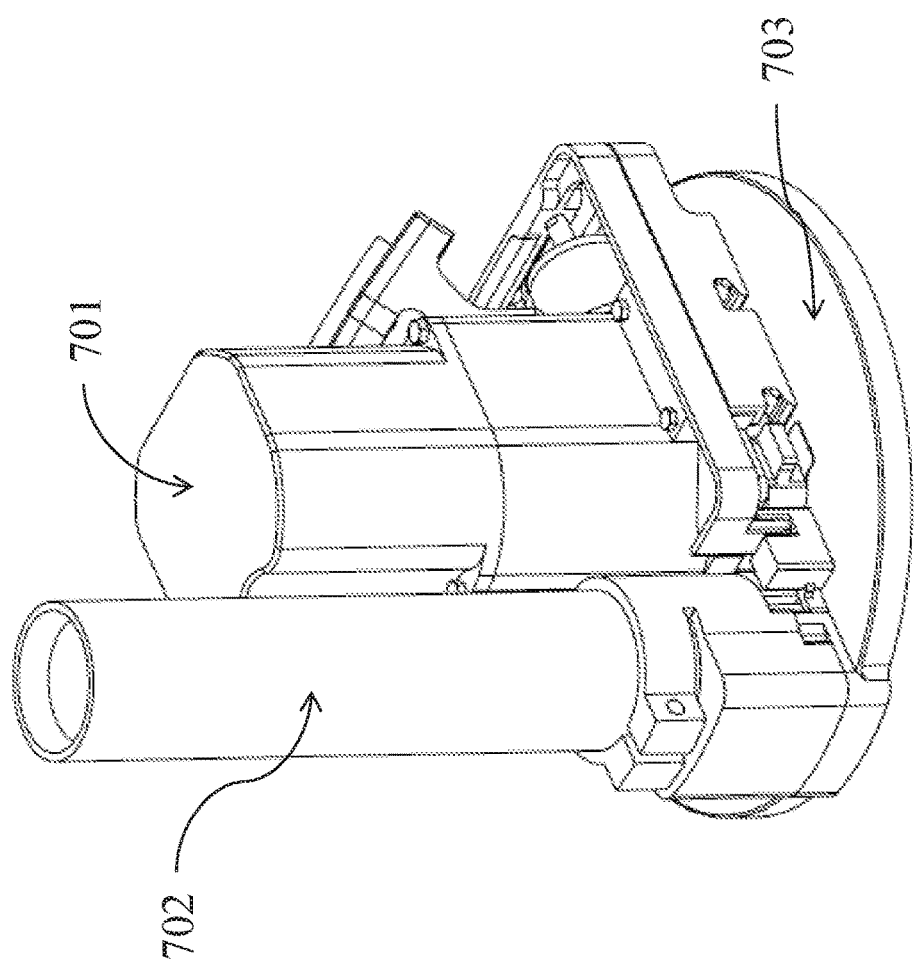
FIG. 7 depicts an isometric view of the sliced food slicer mounted to the robot master tool.
Figures 8A, 8B:
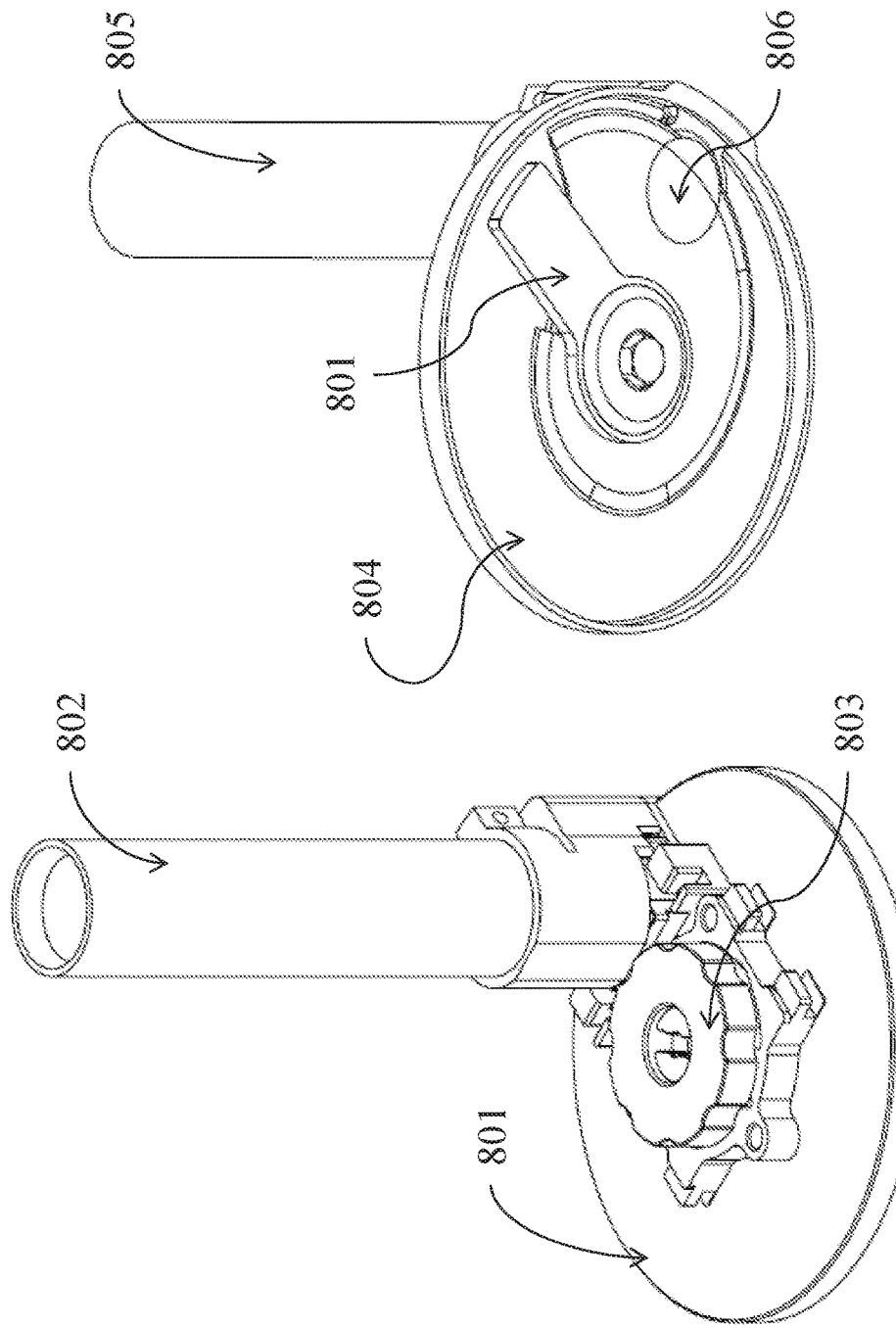
FIG. 8A depicts an upper isometric view of the sliced food slicer before attachment to the robot master tool.
FIG. 8B depicts a lower isometric view of the sliced food slicer before attachment to the robot master tool.
Figure 9:
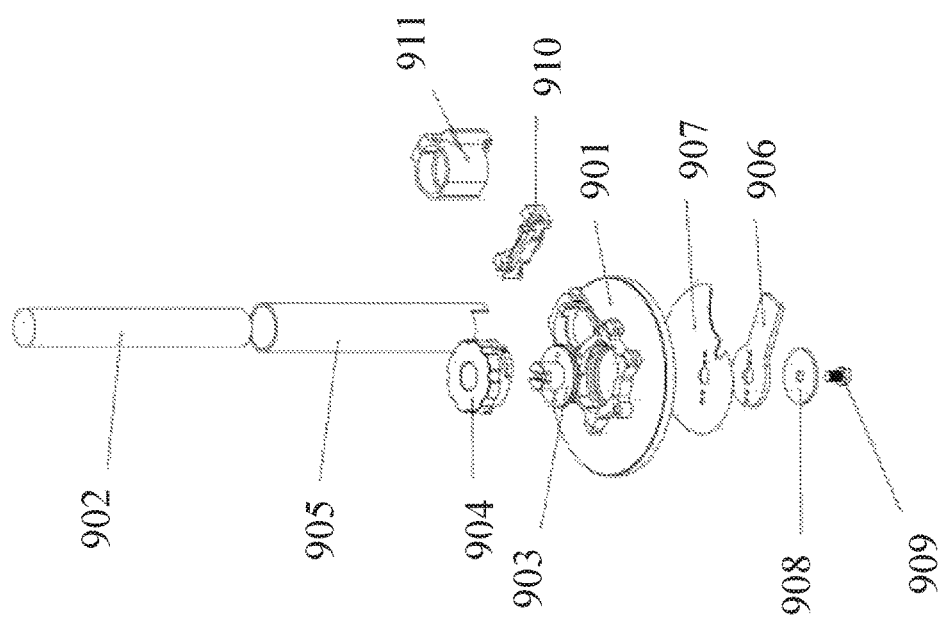
FIG. 9 depicts an exploded view of the sliced food slicer.

Referencing FIG. 5A an top isometric view of the dispensing master 501 is shown with the robot attachment point 502, and ingredient dispenser clamp arms 503. Referencing FIG. 5B, a bottom isometric view shows a food ingredient dispensing head clamping arm 504 and locating pins 506. Referencing FIG. 6 an exploded view of the dispensing master comprising the following non-limiting components: tool motor/gearbox base 601, the tool motor or servo motor drive 602, gearbox 608, robot interface plate 603, pneumatic cylinders 604, clamp arm tooling 605, servo cover 606, locating pins 607, product clam 609, head adapter 610, fasteners 611, product head adapter 612, slide guide 613, servo cover bolt 614, and slide bolt 615. Referencing FIG. 7, an isometric drawing of a sliced food, or pepperoni, dispenser is presented having the dispensing master 701 with a pepperoni dispenser 702 having a base member 703 for attachment to the dispensing master 701. An alignment and slicing feature allows for cutting and/or placement of sliced or unsliced pepperoni onto the surface of the food item, such as a pizza. FIG. 8A is an isometric of the pepperoni dispenser without the dispensing master attached. The dispensing master attachment drive lock 803 allows for attachment of the pepperoni dispenser 801 to the dispensing master (not shown) the support base 801 having a slicer is capable of supporting one or more pepperoni slicer tubes 802 for automated re-fill and re-use of dispensers. Turning to FIG. 8B, a bottom isometric view of the sliced food dispenser slicer tube (pepperoni) 805 comprising a base 804 and thickness adjuster 801 capable of having the slicer 807 slice the pepperoni protruded via the opening 806 below the slicer tube 805. Referencing FIG. 9 is an exploded view of the pepperoni dispensing head showing the various components of the dispensing head: the slicer base 901, sausage or meat product 902, slicer tube 905, slicer drive cam 903, drive lock 904, slice thickness stop 906, involute blade slicer 907, slicer washer 908, mounting bolt 909, slicer clamp 910, and tube clamp 911.

Figure 10:
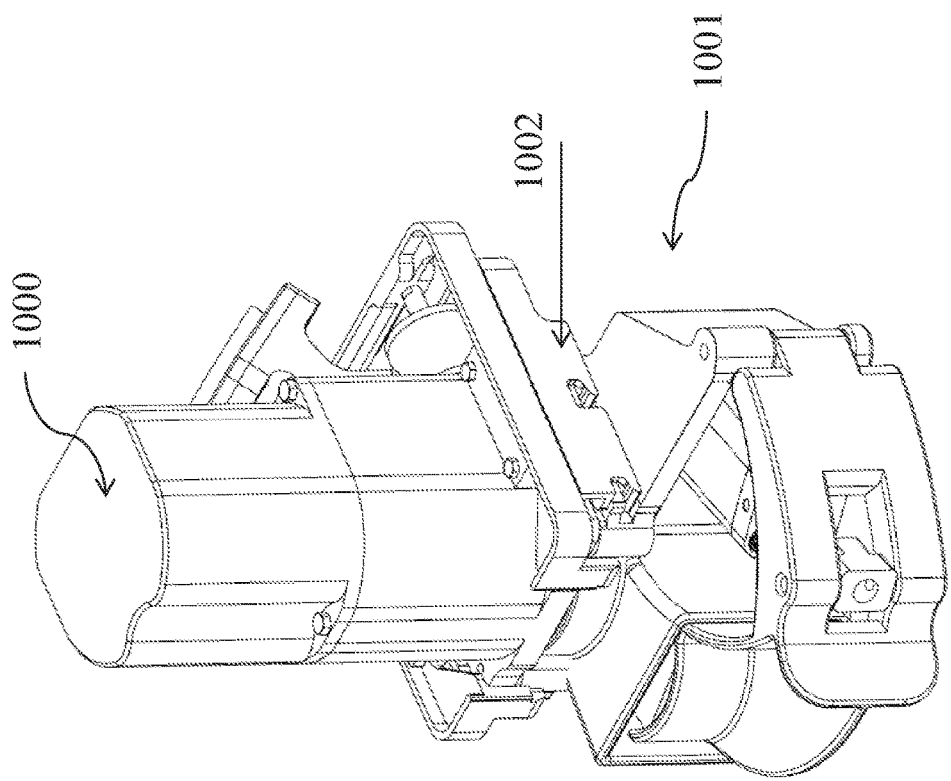
FIG. 10 depicts an isometric view of a cheese grater mounted to the robot master tool.
Figure 11:
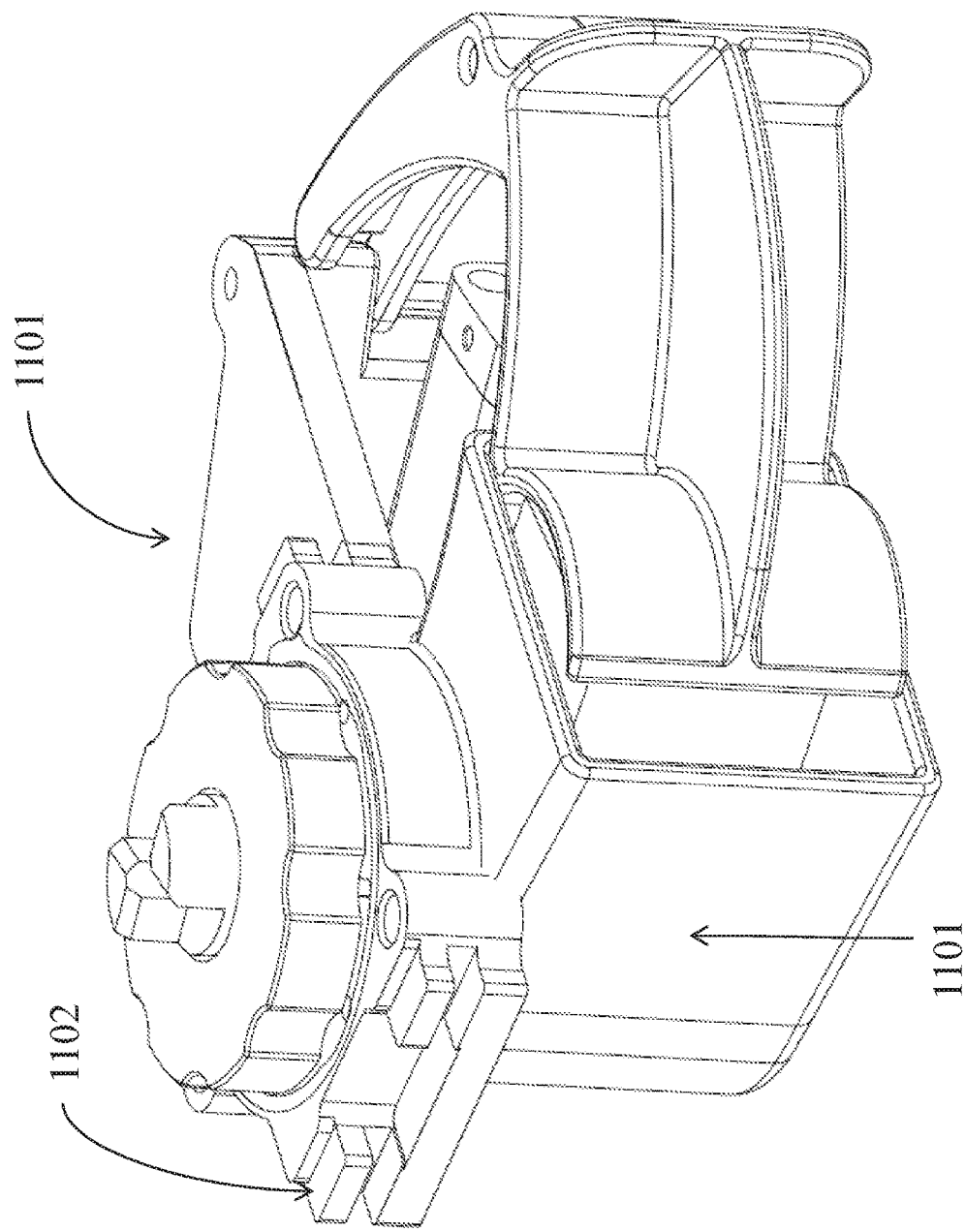
FIG. 11 depicts an isometric view of the cheese grater before attachment to the robot master tool.
Figure 12:
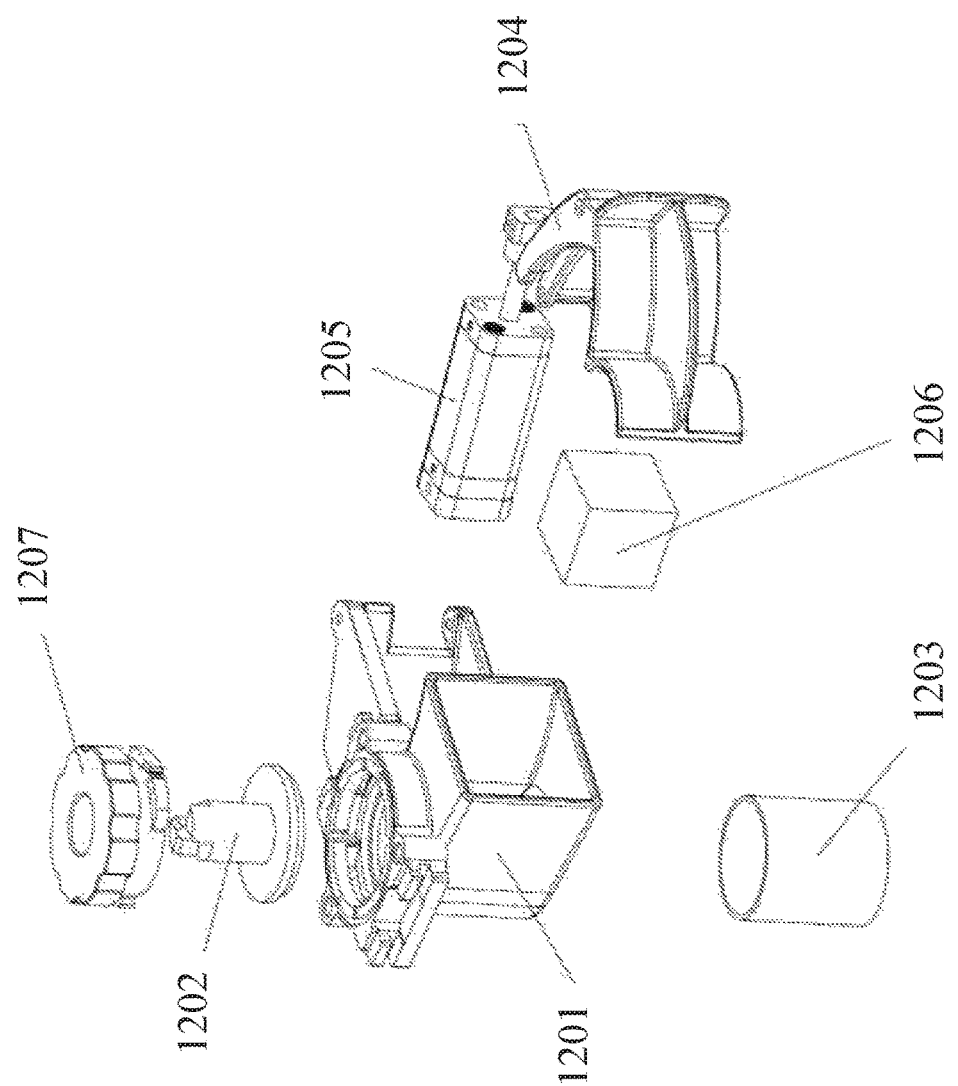
FIG. 12 depicts an exploded view of the cheese grater.

Referencing FIG. 10 an isometric view of a cheese grater dispenser head 1001 capable of attaching to the dispensing master 1000 via the attachment drive lock 1002. FIG. 11 is an isometric top view of the of the cheese grater head 1101 without showing the dispensing master. The cheese grater head 1101 is capable of attaching to the dispensing master via the drive lock 1102. FIG. 12 is an exploded view of the cheese grater head showing the slicer base 1201, cheese drive cam 1202, cheese knife grater 1203, cheese press head 1204, cheese press cylinder 1205, cheese ingredient 1206, and drive lock 1207.

Figure 13:
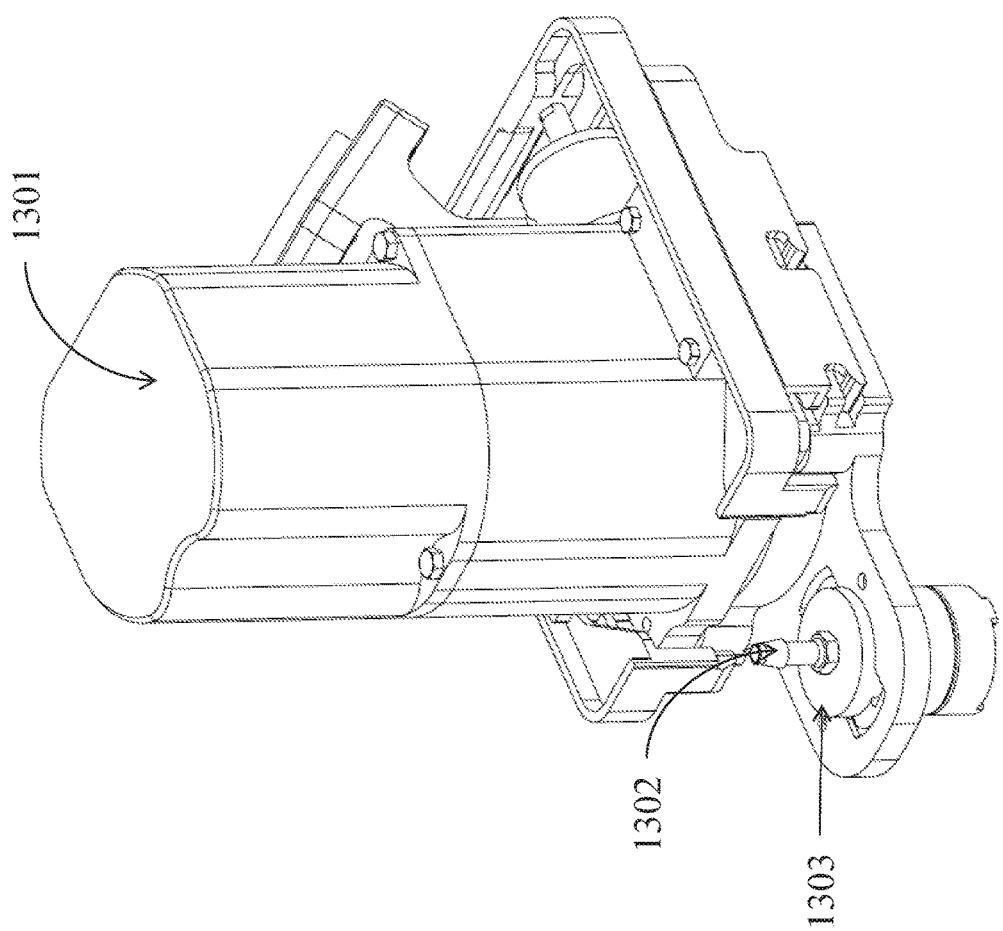
FIG. 13 depicts an isometric view of the sauce dispenser mounted to the robot master tool.
Figure 14:
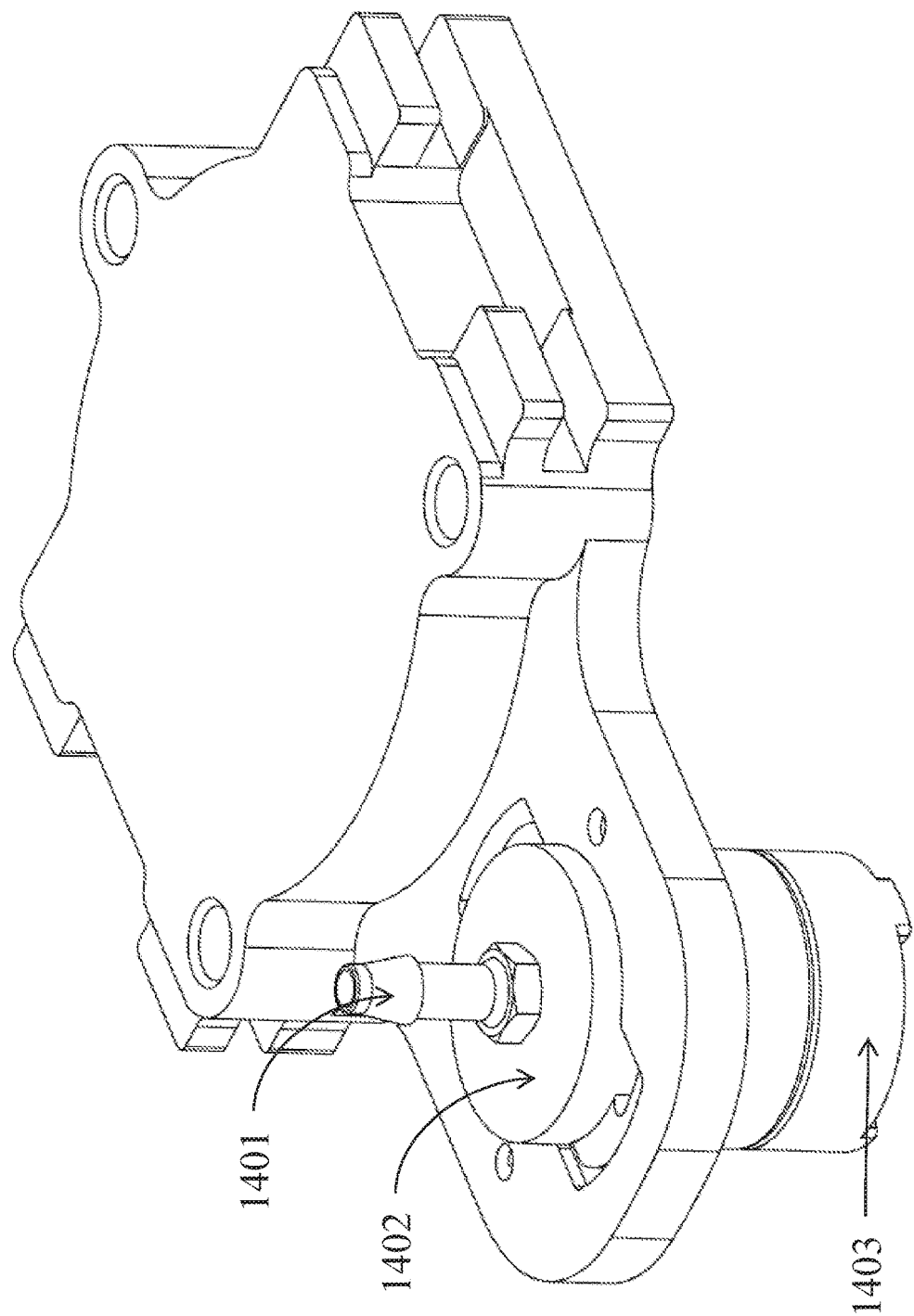
FIG. 14 depicts an isometric view of the sauce dispenser before attachment to the robot master tool.
Figure 15:
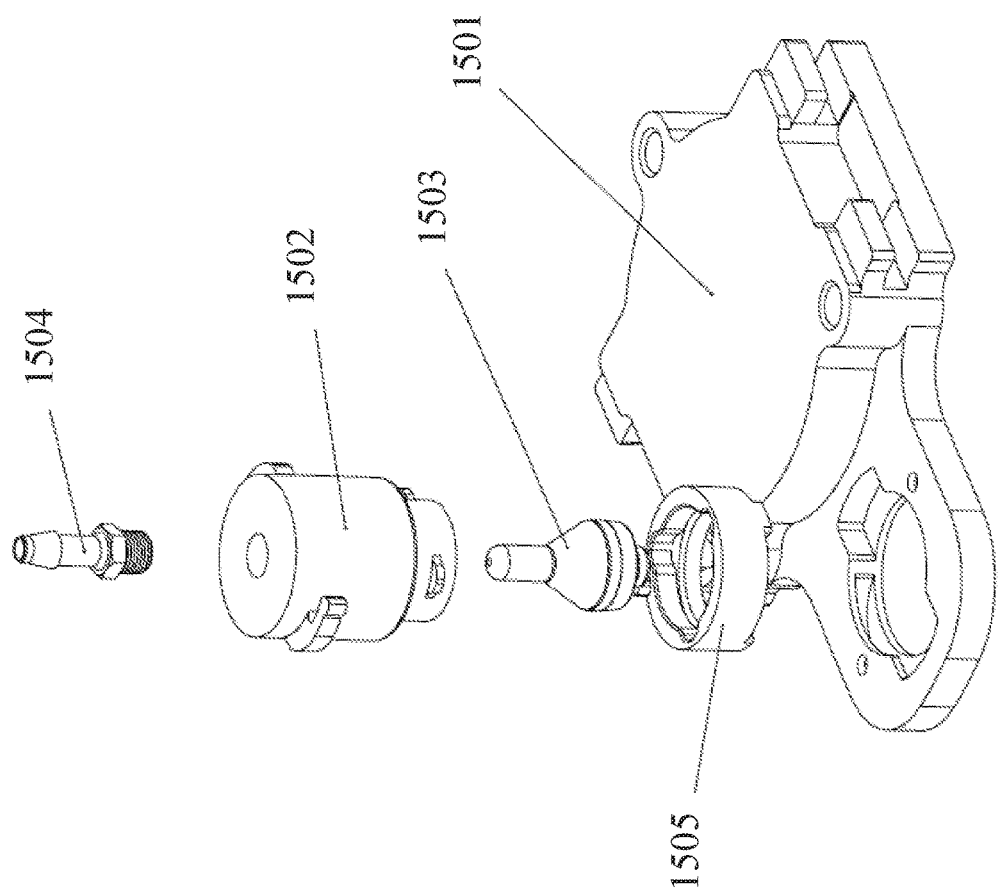
FIG. 15 depicts an exploded view of the sauce dispenser.

Referencing FIGS. 13 and 14 is an isometric of a sauce (or condiment) dispensing head. The sauce is dispensed via a head 1302, which may be fed via tubing for continuous supply which is removably attached to the hose fitting 1302. FIG. 14 presents the sauce dispensing head without the dispensing master. A hose fitting 1401 is capable of receiving a source of sauce or liquid condiment, the sauce diffuser 1402 is affixed to the sauce dispensing head via a diffuser retainer 1403. The exploded view of the sauce dispenser head is presented in FIG. 15. The components include a static base 1501, a sauce diffuser 1502, an internal sauce diffuser 1503, a hose fitting 1504 for receiving the liquid sauce or condiment, and a diffuser retainer 1505.

Figure 16:
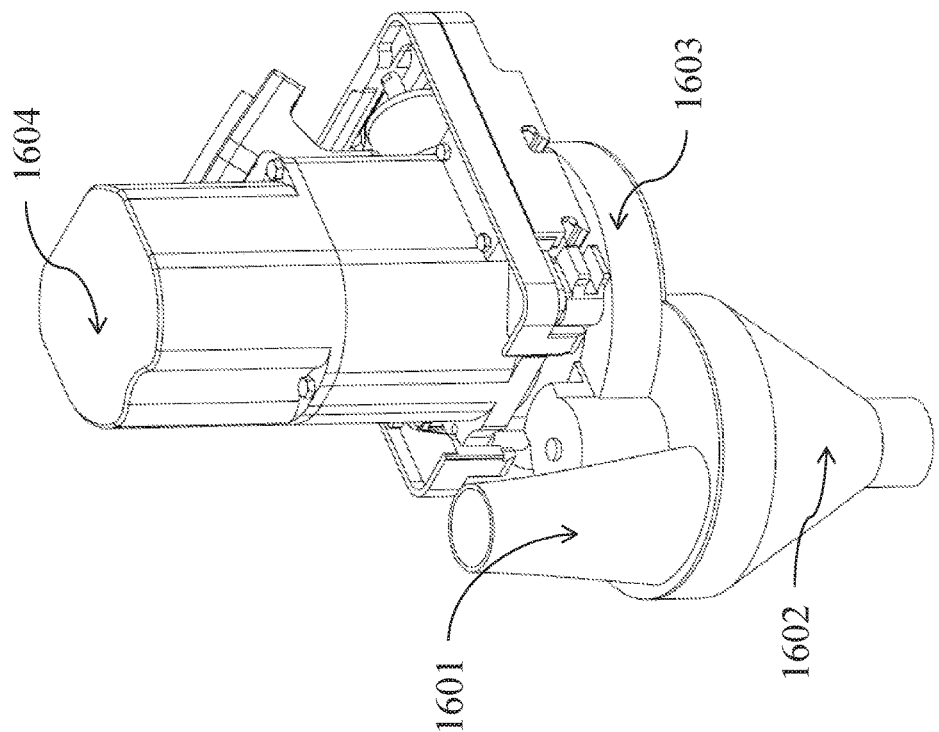
FIG. 16 depicts an isometric view of the ground product dispenser mounted to the robot master tool.
Figure 17:
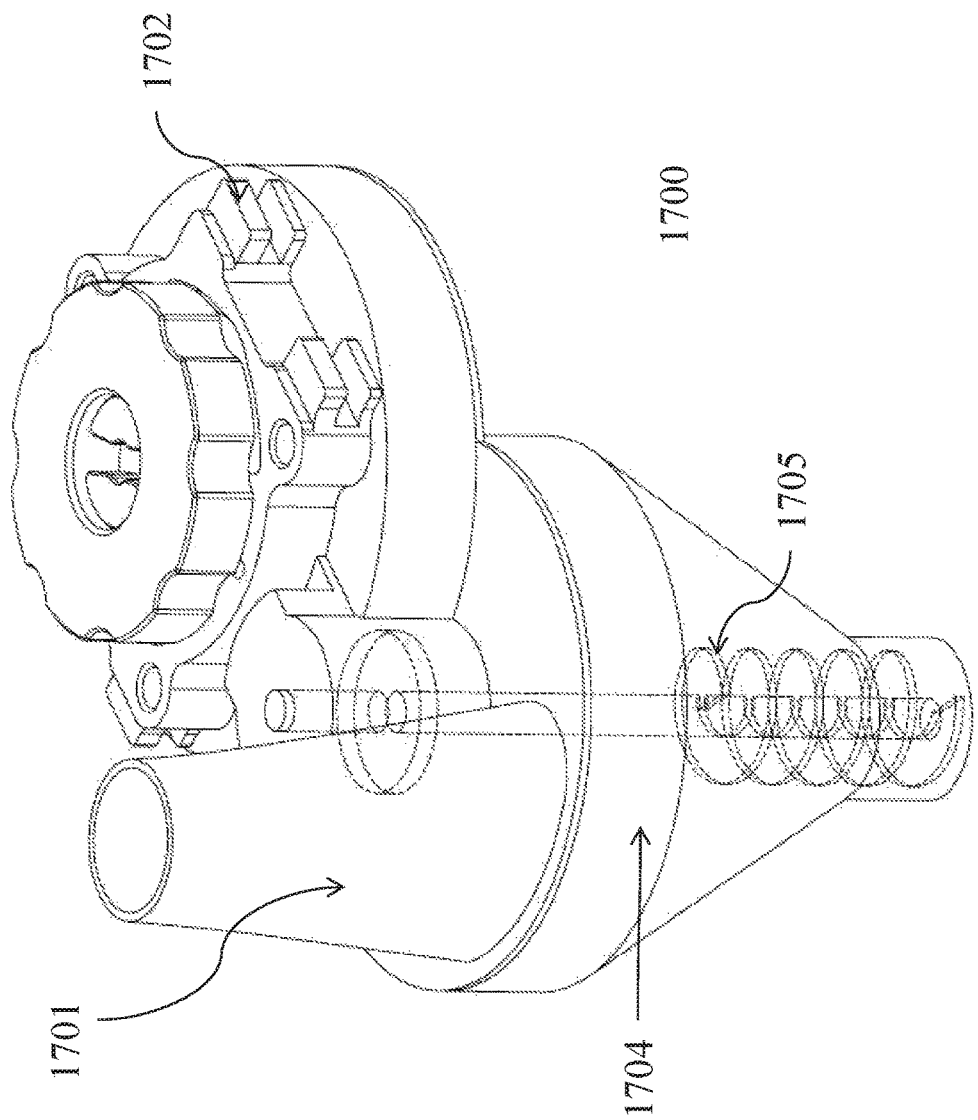
FIG. 17 depicts an isometric view of the ground product dispenser before attachment to the robot master tool.

Referencing FIG. 16 an isometric drawing of a ground product dispenser is presented having the dispensing master 1604 with a ground product dispenser comprising a fixed base 1603 for attachment to the dispensing master 1604, an auger present in a funnel configuration 1602, and a feed hopper 1601. FIG. 17 is an isometric of the ground product dispenser 1700 without the dispensing master attached. The dispensing master attachment drive lock 1702 allows for attachment of the ground product dispenser 1700 to the dispensing master (not shown). The feed funnel 1704 attaches to the ground product feed hopper 1701 and supports the ground product feed auger 1705 which feeds the ground product out the bottom opening of the feed funnel 1704.

Figure 18:
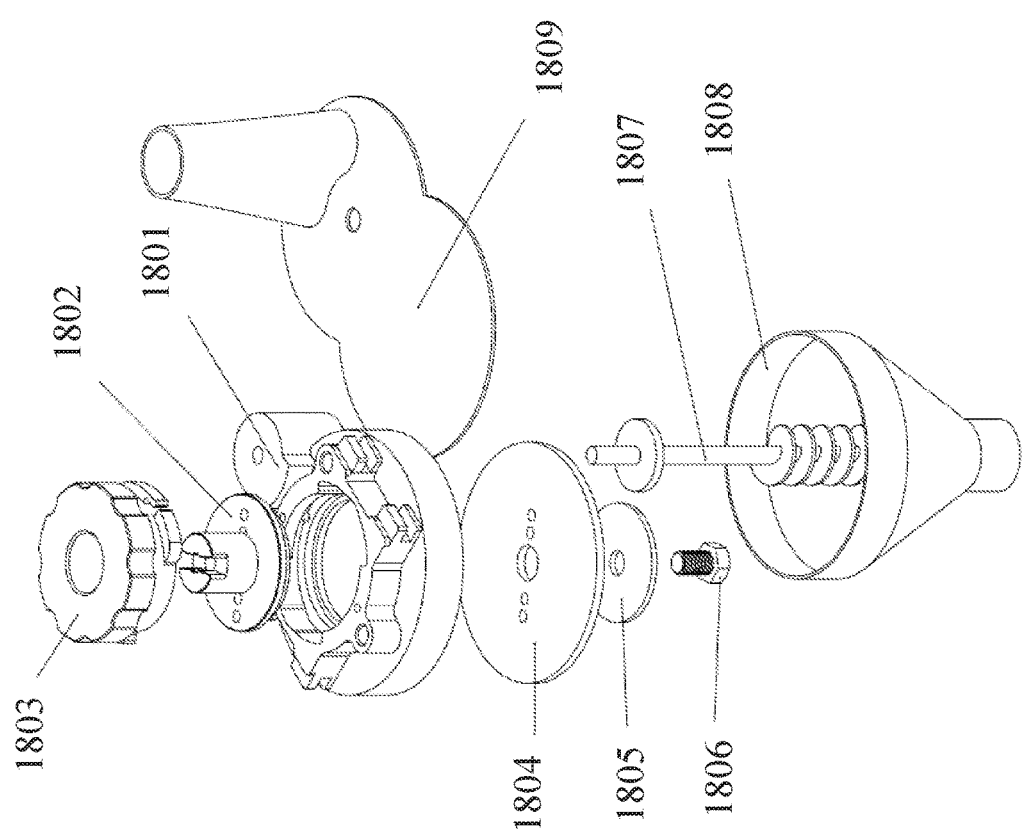
FIG. 18 depicts an exploded view of the ground product dispenser.

FIG. 18 presents an exploded view of the ground product dispensing head showing the auger feeder base 1801, the drive cam 1802, the drive lock 1803, the master gear 1804, a drive gear washer 1805, mounting bolt 1806, auger 1807, feed funnel 1808, and the feed hopper with a base 1809. The ground product dispensing head is capable of being operably connected to the dispensing master for dispensing ground foods, such as burger or sausage, ground spices, or ground vegetables.

In another embodiment, additional feeding heads may be aligned in series to feed additional food items. In another embodiment, the feeding heads may be continuously fed via tubes directed to supply vesicles.

In another embodiment, chillers or enclosed refrigerated work zones may be utilized to ensure safety and ease of use. In another embodiment, such enclosed preparation zones may be remote, subject to mail order or internet on-demand order and delivery.

In another embodiment, a vision system, including video recording, may be implemented to ensure quality, detect errors, and to provide documentation of food preparation for customers to view and share.

In another embodiment, a cutting or slicing head may be utilized to slice the prepared food, such as a sandwich or pizza, for consumption. In another embodiment, individual slices or unique food designs may be prepared using the present invention, including writings, numbers, and symbols. Utilizing multiple dispensing heads, varying sizes of similar foot items may be utilized for designs and creative food preparation, such as alignment of food items which avoid getting cut when slicing or that have exact uniformity in each slice.

Those skilled in the art will recognize that the methods and articles of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently. While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

For the purposes of the present invention, the finished food item may further be cooked, baked, aged, cooled, froze, or otherwise finished following the preparation step of the food items. In another embodiment, a protective enclosure, which may comprise packaging or freeze drying, may then be then applied.

Those skilled in the art will recognize that the methods and articles of the present invention may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present invention covers conventionally known manners for carrying out the described features and functions and interfaces, as well as those variations and modifications that may be made to the hardware or software or firmware components described herein as would be understood by those skilled in the art now and hereafter.

Alternative embodiments are contemplated in which the order of the various operations is altered and in which sub-operations described as being part of a larger operation are performed independently. While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. An apparatus for preparation of food items, comprising:
   a first food ingredient dispensing head defining a first drive lock and a first base member;
   a second food ingredient dispensing head defining a second drive lock and a second base member;
   a robot assembly within reach of the first and second food ingredient dispensing heads, the robot assembly having a dispensing master comprising:
   a product head adapter configured to selectively couple to the first drive lock or the second drive lock of either food ingredient dispensing head; and
   clamping arms configured to selectively slide over the base member of either food ingredient dispensing head;
   the first and second food ingredient dispensing heads are each selected from a group consisting of: a sauce dispensing head configured to dispense sauce, a cheese dispensing head configured to dispense cheese, a sliced food dispensing head configured to slice and dispense food, and a ground food dispensing head configured to dispense ground food, wherein the dispensing master is operably connectible to each of the first and second food ingredient dispensing heads;
   a support surface configured to store the first and second food ingredient dispensing heads within reach of the robot assembly;
   a food preparation surface within reach of the robot assembly for preparing food items; and
   a controller in electronic communication with the robot assembly via a communication link.

2. The apparatus of claim 1, wherein the robot assembly comprises a multi-axis robot configurable to perform predetermined movements.

3. The apparatus of claim 1, wherein the dispensing master further comprises a master tool motor operatively coupled to the product head adapter.

4. The apparatus of claim 1, wherein the clamping arms further define a gripping device for removably attaching the first and second food ingredient dispensing heads.

5. The apparatus of claim 1, wherein the first food ingredient dispensing head comprises a sauce dispensing head comprising:
   a static base;
   a diffuser retainer coupled to the static base;
   a sauce diffuser coupled to the diffuser retainer; and
   a hose fitting configured to receive a source of sauce, the hose fitting coupled to the sauce diffuser.

6. The apparatus of claim 1, wherein the first food ingredient dispensing head comprises a cheese dispensing head comprising:
   a slicer base;
   a cheese grater head; and
   a drive lock coupled to the slicer base and configured to couple the cheese grater head to the product head adapter of the dispensing master.

7. The apparatus of claim 1, wherein the first food ingredient dispensing head comprises a sliced food dispensing head comprising:
   a support base configured to couple a slicer tube;
   a slicer; and
   a drive lock coupled to the support base and configured to couple the slicer to the product head adapter of the dispensing master.

8. The apparatus of claim 1, wherein the first food ingredient dispensing head comprises a ground food dispensing head comprising:
   a fixed base;
   a around product dispenser; and
   a drive lock coupled to the fixed base and configured to Couple the around product dispenser to the dispensing master.

9. The apparatus of claim 4, wherein the sauce dispensing head further comprises a reservoir and a pump configured to pump sauce from the reservoir onto the food items.

10. The apparatus of claim 1, wherein the first food ingredient dispensing head comprises a cheese dispensing head further comprising a grating disk driven by a dispensing master tool motor and a cylinder for applying pressure to a cheese block.

11. The apparatus of claim 10, wherein the cheese dispensing head further comprises a thermo-coupler operably connected to a chilled coupler while in storage to maintain temperature of the cheese.

12. The apparatus of claim 1, wherein the first food ingredient dispensing head comprises a ground food dispensing head further comprising a paddle wheel or auger driven by a dispensing master tool motor that moves ingredients out of a reservoir onto the food items.

13. The apparatus of claim 1, wherein the first food ingredient dispensing head comprises a sliced food dispensing head further comprising a blade for slicing meat extruded through a storage tube located on the sliced food dispensing head, said blade driven by a dispensing master tool motor, and wherein the sliced food is sliced to drop onto a food item at a programmed position.

14. The apparatus of claim 1, further comprising a food preparation surface transfer device configured to transfer food into and from the food preparation surface.

15. The apparatus of claim 14, wherein the surface transfer device comprises a conveyor belt.

16. The apparatus of claim 14, wherein the surface transfer device comprises a tray system removable by the robot assembly.

* * * * *